(12) United States Patent
Trotter et al.

(10) Patent No.: US 9,920,788 B2
(45) Date of Patent: Mar. 20, 2018

(54) LINKING ARM ASSEMBLY

(71) Applicant: ILLINOIS TOOL WORKS INC., Glenview, IL (US)

(72) Inventors: Jason K. Trotter, Des Plaines, IL (US); Dennis M. Mark, Buffalo Grove, IL (US)

(73) Assignee: Illinois Tool Works Inc., Glenview, IL (US)

( * ) Notice: Subject to any disclaimer, the term of this patent is extended or adjusted under 35 U.S.C. 154(b) by 251 days.

(21) Appl. No.: 14/768,483

(22) PCT Filed: Feb. 8, 2014

(86) PCT No.: PCT/US2014/015450
§ 371 (c)(1),
(2) Date: Aug. 18, 2015

(87) PCT Pub. No.: WO2014/130273
PCT Pub. Date: Aug. 28, 2014

(65) Prior Publication Data
US 2016/0003292 A1    Jan. 7, 2016

Related U.S. Application Data

(60) Provisional application No. 61/768,754, filed on Feb. 25, 2013.

(51) Int. Cl.
*F16C 11/06* (2006.01)
*B60G 7/00* (2006.01)

(52) U.S. Cl.
CPC .......... *F16C 11/0623* (2013.01); *B60G 7/001* (2013.01); *B60G 7/005* (2013.01);
(Continued)

(58) Field of Classification Search
CPC . F16C 11/0671; F16C 11/0666; F16C 11/068; F16C 11/0619; F16C 11/0614;
(Continued)

(56) References Cited

U.S. PATENT DOCUMENTS 1,742,782 A * 1/1930 Parker ...................... B62D 7/16
403/74
1,930,676 A * 10/1933 Farr .......................... B62D 7/16
403/355
(Continued)

FOREIGN PATENT DOCUMENTS

CN    2859060 Y    1/2007
CN    1997829 A    7/2007
(Continued)

OTHER PUBLICATIONS

ISR and WO for PCT/US2014/015450 dated May 6, 2014.

*Primary Examiner* — Daniel J Wiley
(74) *Attorney, Agent, or Firm* — Joseph M. Butscher; The Small Patent Law Group, LLC

(57) ABSTRACT

A linking arm assembly incorporating an improved connection between an elongated rod portion and an engagement element such as a ball stud or the like adapted to join the linking arm to another structure. The linking arm assembly may incorporate an improved ball and socket connection. The socket may include an arrangement of flexible rib elements that are compressed when the ball stud is inserted so as to bias against the ball during use.

20 Claims, 7 Drawing Sheets

(52) U.S. Cl.
CPC ...... *F16C 11/0657* (2013.01); *F16C 11/0695* (2013.01); *B60G 2204/1224* (2013.01); *B60G 2204/416* (2013.01); *B60G 2206/11* (2013.01); *B60G 2206/71* (2013.01); *B60G 2206/7104* (2013.01); *B60G 2206/7105* (2013.01); *F16C 2300/02* (2013.01); *F16C 2326/05* (2013.01)

(58) Field of Classification Search
CPC .... F16C 11/0623; F16C 11/0642; F16J 3/042; F16J 15/52; Y10T 403/31; Y10T 403/315; Y10T 403/32196; Y10T 403/32311; Y10T 403/32631
See application file for complete search history.

(56) References Cited

U.S. PATENT DOCUMENTS

| | | | | |
|---|---|---|---|---|
| 1,983,947 | A * | 12/1934 | Rockwell | B62D 7/16 105/22 |
| 3,013,437 | A * | 12/1961 | Harding | F16C 3/28 74/469 |
| 3,498,652 | A * | 3/1970 | Cass | B62D 7/16 403/290 |
| 3,938,822 | A * | 2/1976 | Guerriero | B60G 21/0551 280/86.758 |
| 4,581,953 | A | 4/1986 | Walston et al. | |
| 4,615,638 | A * | 10/1986 | Ito | F16C 11/0638 384/203 |
| 5,529,316 | A * | 6/1996 | Mattila | B62D 17/00 280/93.51 |
| 6,398,446 | B1 * | 6/2002 | Pazdirek | B60G 7/001 403/122 |
| 6,666,467 | B2 * | 12/2003 | Bernhardt | B62D 7/20 280/93.51 |
| 6,902,341 | B1 * | 6/2005 | Rauschert | F16C 7/02 403/301 |
| 7,017,224 | B2 * | 3/2006 | Buchanan, Jr. | B60S 1/24 15/250.27 |
| 7,059,009 | B2 * | 6/2006 | Bryson | B60S 1/24 15/250.27 |
| 8,061,921 | B2 * | 11/2011 | Seol | F16C 11/0638 403/124 |
| 8,870,201 | B2 * | 10/2014 | Kuroda | B60G 21/055 280/93.511 |
| 9,227,661 | B2 * | 1/2016 | Seibert | B62D 7/20 |
| 2002/0076265 | A1 | 6/2002 | Yagyu | |
| 2008/0138150 | A1 | 6/2008 | Budde et al. | |
| 2011/0150563 | A1 | 6/2011 | Kuroda | |

FOREIGN PATENT DOCUMENTS

| | | |
|---|---|---|
| CN | 101048606 A | 10/2007 |
| CN | 102149930 A | 8/2011 |
| DE | 102008010248 A1 | 8/2009 |
| EP | 1031745 A2 | 8/2000 |
| JP | 11093997 A | 4/1999 |
| WO | 2009152857 A1 | 12/2009 |

* cited by examiner

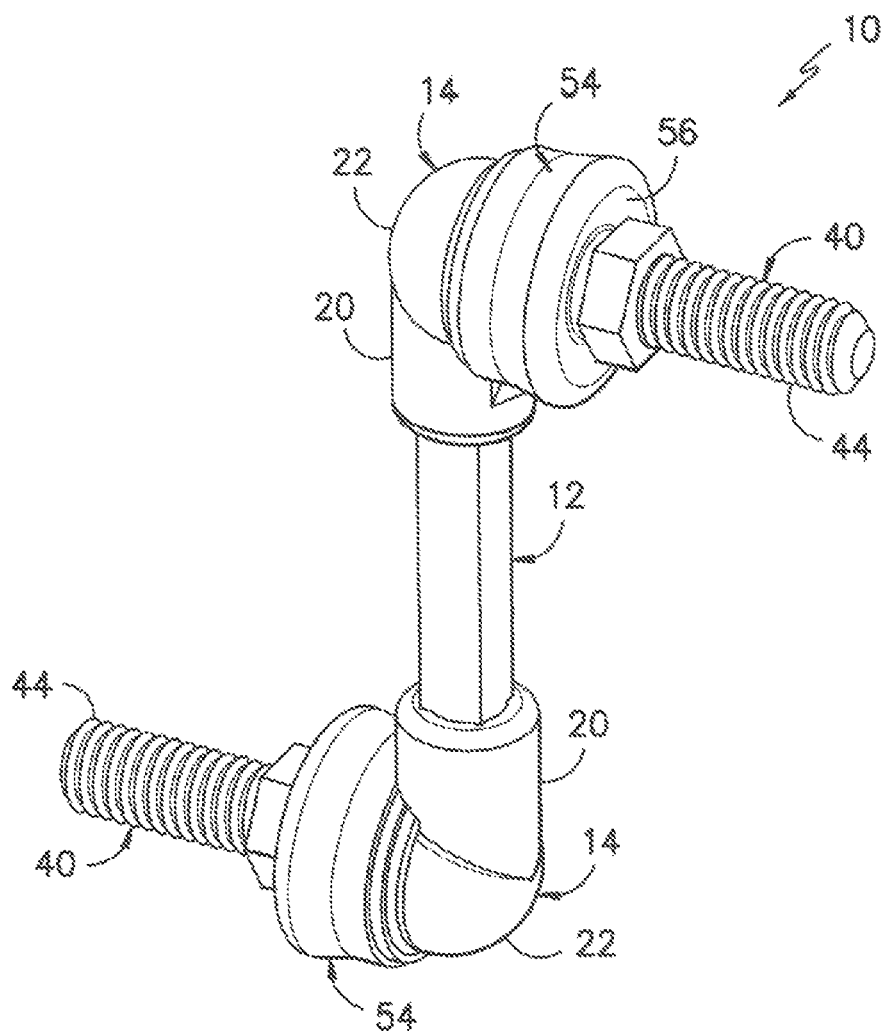
FIG. -1-

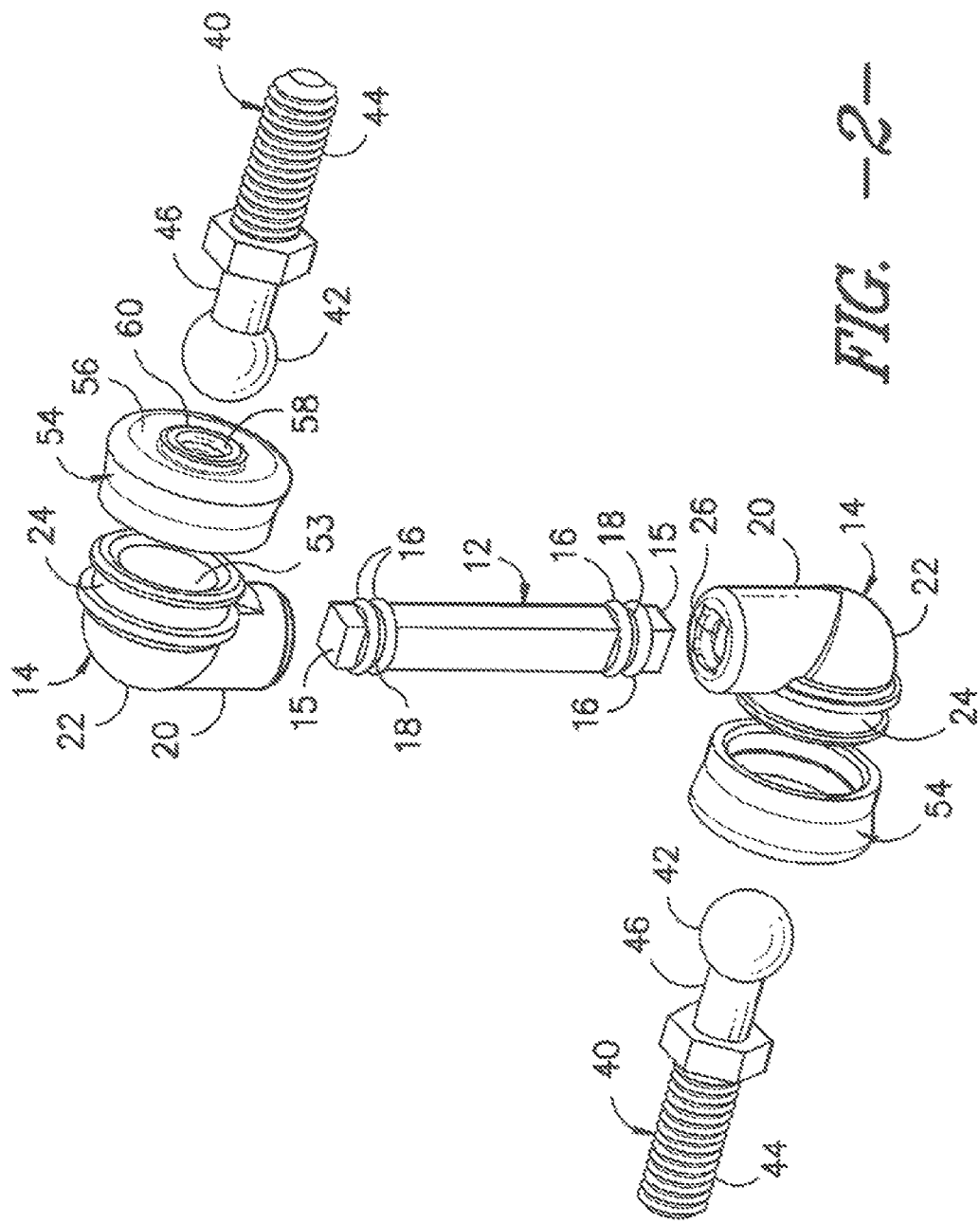

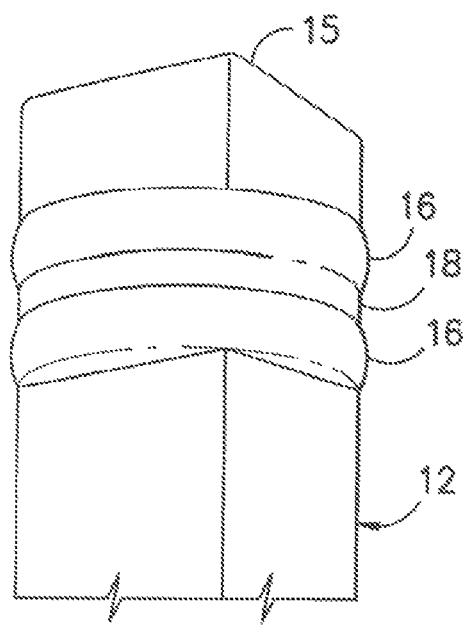
FIG. -3-
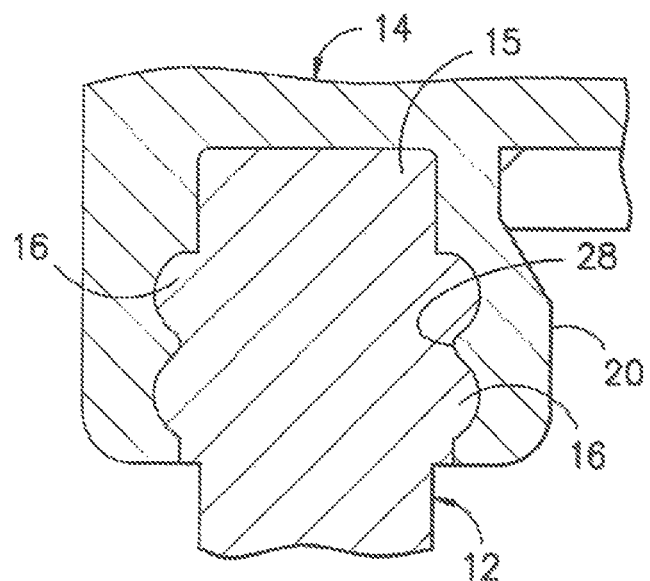
FIG. -4-

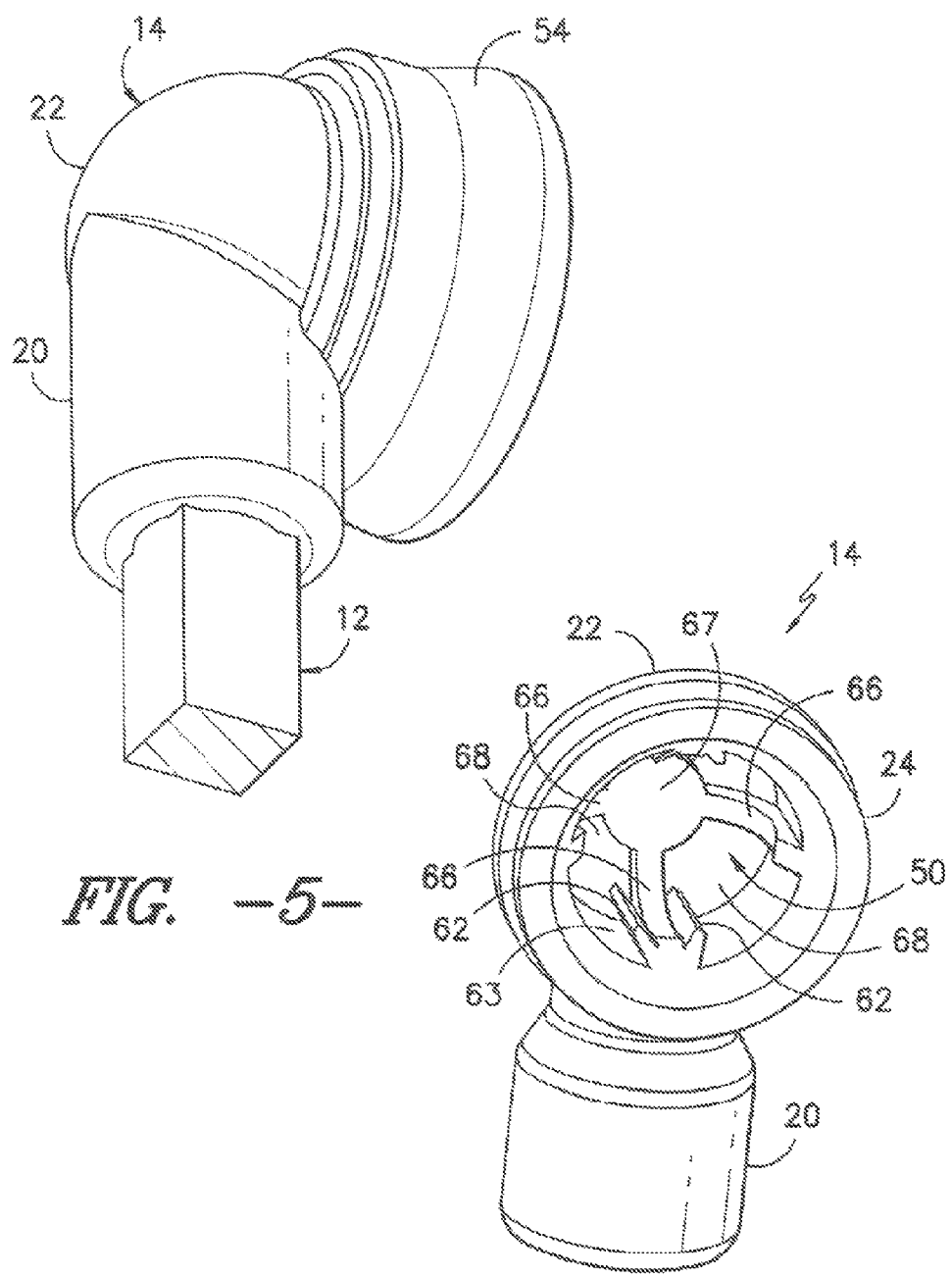
FIG. -5-
FIG. -6-

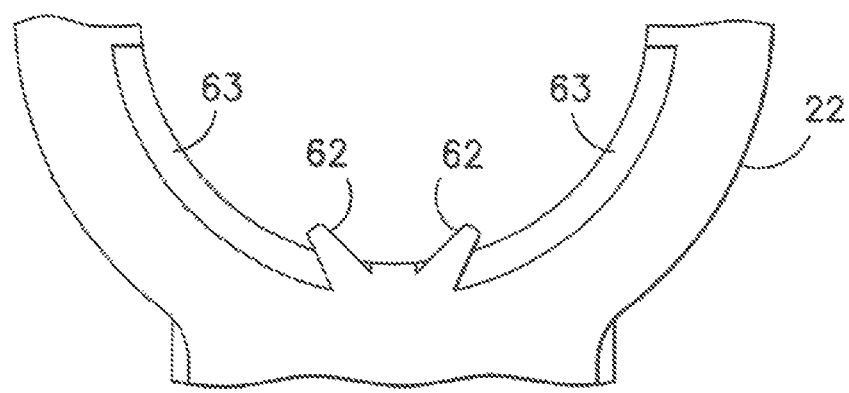
FIG. -7-
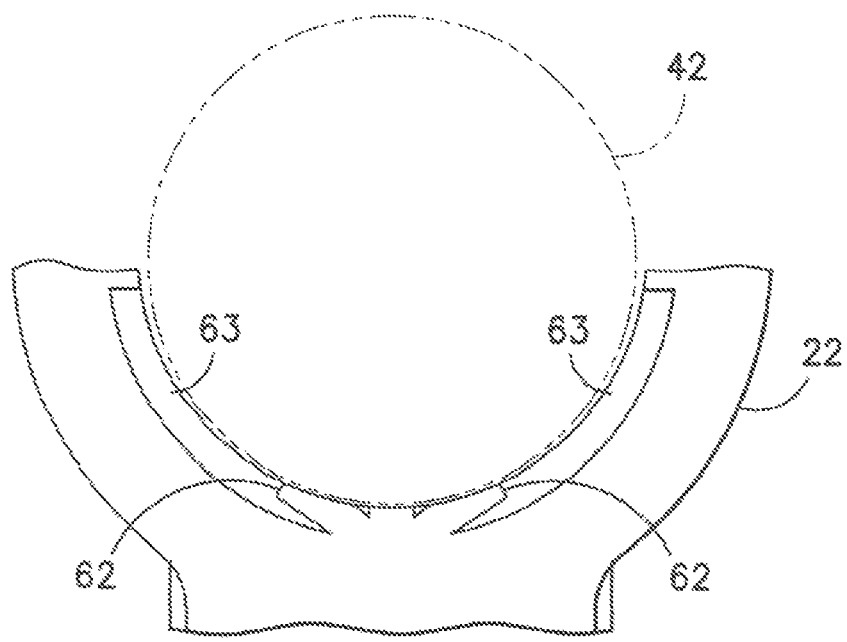
FIG. -8-

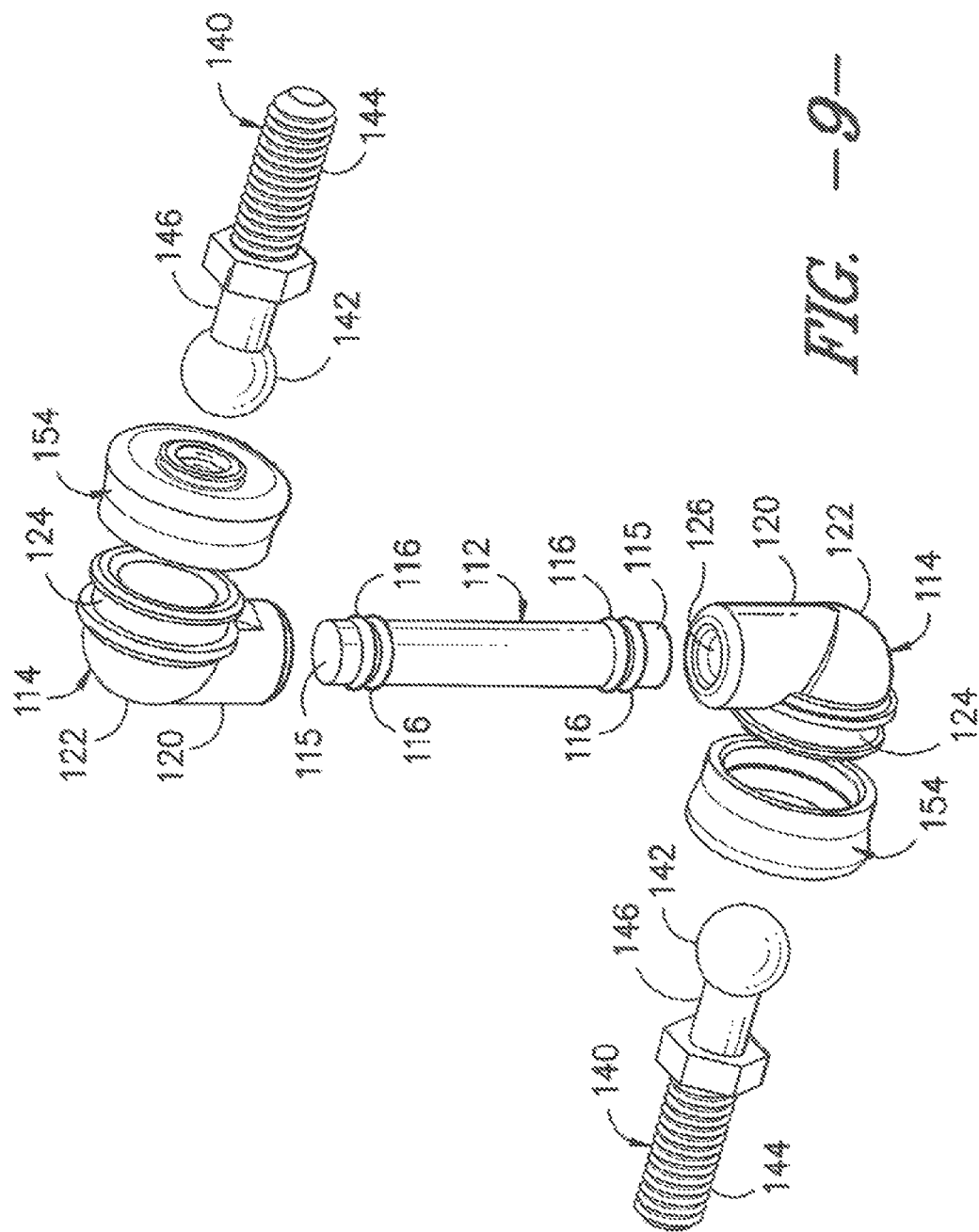
FIG. -9-

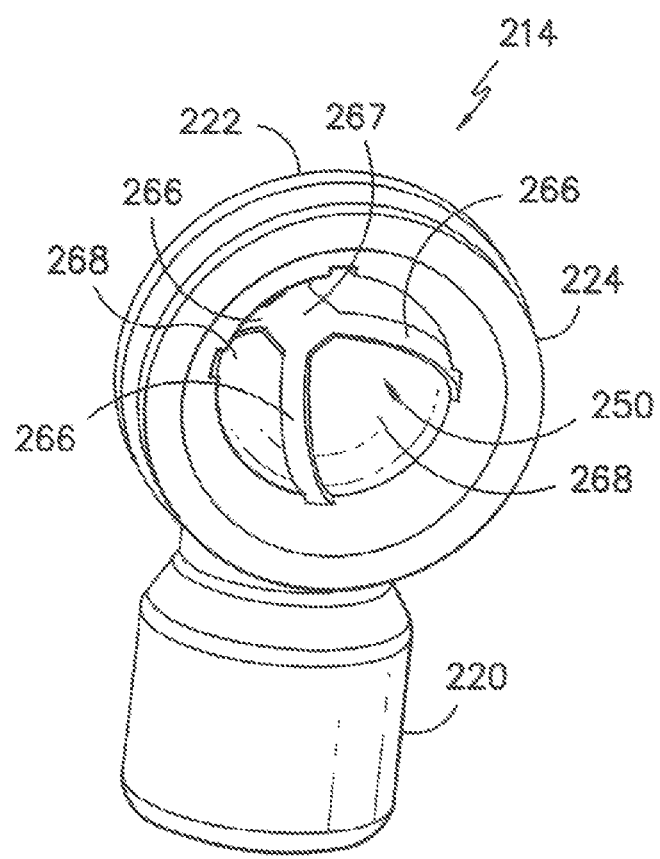
FIG. -10-

LINKING ARM ASSEMBLY

CROSS-REFERENCE TO RELATED APPLICATION

This non-provisional application is a National Phase of PCT/US2014/015450filed Feb. 8, 2014 and claims the benefit of, and priority from, U.S. Provisional Application No. 61/768,754 filed Feb. 25, 2013. The contents of such provisional application and any other patent documents referenced in this application are hereby incorporated by reference in their entirety as if fully set forth herein.

TECHNICAL FIELD

The present disclosure relates generally to a linking arm assembly, and is more particularly directed to a linking arm assembly having an improved operative connection between a rod portion and an engagement element such as a ball stud or the like adapted to join the linking arm to another structure.

BACKGROUND

In many operational environments one or more linking arm assemblies may be operatively connected to a structure for use in monitoring the position of that structure relative to a defined reference position. In many of these linking arm assemblies, a rod extends between a pair of socket heads or other attachment elements at either end of the rod. The attachment element at one end of the rod is attached to a ball stud or other engagement element at the structure to be monitored, and the attachment element at the other end is operatively connected to a reference structure or is allowed to articulate in a defined manner. The rod may include one or more sensors which monitor the relative positions of the ends. Changes in spacing and/or relative position of the ends can thus be monitored, thereby indicating changes in position. The linking arm assembly is not generally required to carry a significant load. However, the linking arm assembly may be subjected to substantial vibration and high frequency articulating movement during use. Such linking arm assemblies may be used in conjunction with a vehicle computer to monitor headlight leveling, suspension ride height and the like. By way of example only, a linking arm assembly in accordance with the present disclosure may find application as a vehicle ride height sensor linkage. Such a linkage establishes a connection between the vehicle's moveable suspension and a sensor, such as a wheel sensor or the like, which provides position information to an electronic control unit. Of course, such assemblies may likewise be used for any number of other purposes as well.

In some prior linking arms, establishing and maintaining a secure connection between the linking arm and the attached socket structures has required relatively complex assembly practices. Accordingly, a linking arm assembly which promotes secure connection between components while reducing the complexity of the assembly process represents a useful advancement over the current art.

SUMMARY OF THE DISCLOSURE

The present disclosure supplies advantages and alternatives over the prior art by providing a linking arm assembly incorporating an improved connection between an elongated rod portion and an engagement element such as a ball stud or the like adapted to join the linking arm to another structure. The linking arm assembly may incorporate an improved ball and socket connection incorporating a compression socket adapted to surround a proximal portion of a ball stud. The socket may include an arrangement of surfaces inside the socket that are compressed when the ball of a ball stud is inserted so as to continuously bias against the ball during use. The pre-compression aids in centering the ball within the socket. In addition, the spring biasing provides adjustment for diameter variations between the ball and socket due to manufacturing tolerances or wear over time. Accordingly, the joint will avoid a potentially "loose" condition thereby reducing the possibility for noise or failure over time.

In accordance with one exemplary aspect, the present disclosure provides a linking arm assembly adapted to receive and retain a ball stud. The assembly includes an elongated insertable rod including a terminal end with a plurality of radially projecting, spaced-apart surface ribs disposed adjacent the terminal end. The surface ribs define raised surfaces with an intermediate depression between the surface ribs with the terminal end projecting outboard away from the surface ribs. The assembly further includes at least a first socket head of unitary molded construction adapted for press-fit attachment to the terminal end of the rod. The socket head includes a socket cradle, a resilient proximal body segment extending away from the socket cradle in a first direction, and a distal collar segment extending away from the socket cradle in a second direction transverse to the proximal body segment. The proximal body segment includes an interior channel adapted to receive the terminal end of the rod. The distal collar segment defines a stud insertion passageway substantially aligned with a concave socket cavity within the socket cradle. The assembly may further include a flexible sealing boot having a first end adapted for disposition in sealing relation about the distal collar segment and a second end adapted to sealingly surround a portion of the ball stud outboard from the ball structure.

Other features and advantages of the disclosure will become apparent to those of skill in the art upon review of the following detailed description, claims and drawings.

BRIEF DESCRIPTION OF THE DRAWINGS

FIG. 1 is a schematic perspective view illustrating an exemplary embodiment of a linking arm assembly consistent with the present disclosure;

FIG. 2 is a schematic exploded view illustrating the components of the exemplary linking arm assembly of FIG. 1 consistent with the present disclosure;

FIG. 3 is a schematic view illustrating one embodiment of a terminal end of an exemplary connecting rod adapted for matable engagement with an associated socket head in an exemplary linking arm assembly consistent with the present disclosure;

FIG. 4 is a schematic, cross-sectional view illustrating the exemplary connecting rod terminal end of FIG. 3 matedly engaging an associated segment of a socket head in an exemplary linking arm assembly consistent with the present disclosure;

FIG. 5 is a schematic view illustrating the final inserted engagement between the exemplary connecting rod terminal end of FIG. 3 and an associated segment of a socket head in an exemplary linking arm assembly consistent with the present disclosure;

FIG. 6 is a schematic perspective view illustrating an exemplary socket head incorporating a socket cavity with optional spring biasing flap membranes and flexible ribs in a hub and spoke orientation adapted for continuous centering and biasing contact against a cooperating ball structure following installation of a ball stud into the socket cavity in a linking arm assembly consistent with the present disclosure;

FIG. 7 is a schematic view illustrating a perimeter portion of the exemplary socket head of FIG. 6 with the spring biasing flaps in a relaxed, unloaded condition;

FIG. 8 is a view similar to FIG. 7 illustrating the spring biasing flaps in loaded condition corresponding to insertion of a ball stud in a linking arm assembly consistent with the present disclosure;

FIG. 9 is a schematic exploded view similar to FIG. 2 illustrating the components of another exemplary linking arm assembly consistent with the present disclosure; and FIG. 10 is a view similar to FIG. 6, illustrating an alternative embodiment of an exemplary socket head incorporating a socket cavity adapted to provide enhanced pull out force and with grease grooves in a hub and spoke orientation.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and of being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF PREFERRED EMBODIMENTS

Reference will now be made to the drawings, wherein like elements are designated by like reference numerals in the various views. Referring now jointly to FIGS. 1 and 2, an exemplary linking arm assembly 10 consistent with the present disclosure is shown. As illustrated, the exemplary linking arm assembly may include a rod 12 of elongated construction formed of plastic, metal, ceramic, or other suitable material extending between a pair of socket heads 14. In this regard, the linking arm assembly may have the illustrated "Z" shaped arrangement, although other arrangements including, without limitation, a "C" shaped, "L" shaped or "I" shaped construction may likewise be utilized depending on the final environment of use. Moreover, while socket heads 14 are illustrated at both ends of the rod 12, a single socket head at one end may likewise be used if desired. The socket heads 14 may be of substantially unitary molded construction having a degree of elastomeric character to facilitate insertion and retention of the rod 12 and a ball stud 40 in a manner as will be described further hereinafter. By way of example only, and not limitation, the socket heads 14 may be molded from a resilient, flexible polymer such as thermoplastic polyurethane (TPU) or the like. However, other resilient materials such as natural and synthetic rubber may likewise be used if desired.

As best seen through joint reference to FIGS. 2-4, the rod 12 may have a generally polygonal cross-sectional geometry so as to present a number of substantially planar faces about the perimeter. In this regard, while the rod 12 is illustrated as having a substantially square cross section so as to present four substantially equivalent planar faces extending between corners along the length dimension of the rod, it is likewise contemplated that virtually any other perimeter geometry may be used as desired. In practice, the rod 12 may be molded as a unitary structure from relatively rigid structural polymeric materials such as acetal resin, nylon and the like. Of course, other polymeric materials and non-polymeric materials such as metal and the like also may be used if desired.

As shown, in the exemplary construction each end of the rod 12 includes opposing outboard terminal ends 15 with a set of spaced-apart surface ribs 16 disposed in adjacent, inboard relation to each of the terminal ends 15. As best seen in FIG. 3, the surface ribs 16 project radially away from the surface of the rod 12 in a direction substantially perpendicular to a longitudinal axis extending along the length dimension of the rod 12 so as to define a localized enhanced diameter relative to the terminal ends 15 and the center portion of the rod inboard from the set of surface ribs 16. In this regard each set of surface ribs 16 may include two or more ribs positioned at different elevations along the length of the rod 12, such that a depression 18 is formed between the adjacent surface ribs 16. As best seen in FIGS. 3 and 4, in this arrangement the surface ribs 16 define a substantially sine-wave profile adjacent each terminal end 15.

As shown, in accordance with one exemplary practice, the surface ribs 16 may be in the form of ring segments disposed at each planar surface of the rod 12 so as to cooperatively extend substantially about the circumference of the rod 12. However, it is likewise contemplated that one or more surfaces on the rod 12 may be free from surface ribs 16 if desired such that surface ribs 16 do not extend completely about the circumference of the rod 12. As illustrated, the surface ribs 16 may define raised arcs extending between adjacent corners of the rod 12 with the apex of the arcs disposed substantially at the center of each planar face on the rod 12. However, other radially projecting constructions may likewise be used.

As best seen in FIGS. 3 and 4, the surface ribs 16 may have a substantially rounded cross-sectional profile so as to define substantially smooth rounded noses projecting away from the body of the rod 12 with curved upper and lower surfaces converging towards the outer edges of the ribs 16. In this regard, it is contemplated that the surface ribs 16 may be substantially similar to one another in size and shape. However, surface ribs 16 with different sizes and/or shapes may likewise be used if desired. Moreover, while the illustrated exemplary construction incorporates pairs of spaced-apart surface ribs 16 at each end of the rod 12, it is likewise contemplated that a single surface rib may be used or that cooperating surface ribs 16 may be arranged in sets of three or more ribs in spaced-apart relation to one another along the length of the rod 12 if desired.

In the illustrated exemplary embodiment, each of the socket heads 14 may have a generally "L" shaped construction incorporating a proximal body segment 20 of open-ended tubular construction extending away from a generally bowl-shaped socket cradle 22. In the illustrated construction, the socket heads 14 may also include a distal collar segment 24 of substantially hollow ring construction oriented in substantially aligned relation to the socket cradle 22. In practice, the socket heads 14 may be molded as unitary structures from thermoplastic materials such as TPU (thermoplastic polyurethane), TPE (thermoplastic elastomer), or other similar material which is adapted to deform and recover resiliently in response to installation forces.

As illustrated, the proximal body segment 20 of each of the socket heads 14 may include an access opening 26 leading into a rod receiving channel adapted to receive a complimentary terminal end 15 of the rod 12 in press-fit relation at the interior of the proximal body segment. In this regard, the access opening 26 may have a perimeter geometry substantially matching the circumferential geometry and size of the rod 12 so as to provide a snug fit. However, other shapes may likewise be used if desired. As best seen in FIG. 4, the interior of the proximal body segment defining the rod receiving channel may be molded to substantially matedly conform to the exterior of the portion of the rod 12 which is retained therein. In accordance with one exemplary practice, the interior of the proximal body segment 20 may be molded with a mating profile of spaced-apart scalloped indentures positioned to substantially overlay the surface ribs 16 on the rod 12 to provide substantially zero tolerance or slight interference between the rod 12 and the interior of the proximal body segment 20 when the rod 12 is in the final inserted condition. In this regard, a slight interference condition wherein the inner diameter of the receiving channel in the proximal body segment 20 is slightly smaller than the outer diameter defined by the surface ribs 16 may be desirable such that in the final inserted condition the proximal body segment 20 is in tension around the rod 12 and free play between the rod 12 and the socket head 14 is substantially eliminated.

As will be appreciated, the combination of the sine-wave profile defined by the surface ribs 16 and the mating profile at the interior of the proximal body segment 20 may aid in providing a secure tension-fit connection between the rod 12 and the socket head 14 by providing interference against undesired withdrawal of the rod 12. Moreover, such an arrangement may facilitate a snap-in assembly procedure whereby a person can feel the rod 12 snap into place in the final desired orientation within the proximal body segment 20 during the assembly process. In this regard, as the rod 12 is inserted into the proximal body segment 20, the outermost surface rib will first encounter a radially inwardly projecting detent 28 defining a cusp between scalloped indentures at the interior of the proximal body segment 20 and the proximal body segment 20 will deform resiliently to permit passage of the relatively rigid surface rib. As the rod 12 is then pushed further inwardly, the detent 28 may snap back into place in substantial alignment with the depression 18 between the surface ribs 16 (FIG. 4). This snap action permits a person to feel that full and proper insertion has occurred. The resulting connection will be secure, but may be reversed upon the intentional application of adequate axial separation force. As best seen in FIG. 5, in the final inserted condition, the resilient character of the proximal body segment 20 aids in causing the access opening 26 to seal tightly around the rod 12 at a position inboard from the surface ribs 16. This seal aids in preventing the introduction of dirt or other contaminants into the socket head structure.

Referring now to FIGS. 1, 2 and 6, in the illustrated exemplary construction, the socket heads 14 are adapted to receive and retain a ball stud 40 incorporating a ball structure 42 at a proximal end and an engagement structure 44 such as a threaded connection or the like at a distal end. In this regard, while the ball stud 40 is illustrated as having an engagement structure 44 in the form of a male thread, it is likewise contemplated that the engagement structure 44 may be any other male or female connection element as may be desired.

As shown, in the exemplary construction, the socket cradle 22 houses an interior socket cavity 50 (FIG. 6) adapted to receive and retain the ball structure 42 of a cooperating ball stud 40. In this arrangement, the ball structure 42 may be matedly inserted through a stud insertion passageway 53 within the distal collar segment 24. As shown, the stud insertion passageway 53 is in substantially aligned relation with the back of the socket cavity 50. An elastomeric sealing boot 54 of rubber, plastic, or the like may fit in sealing relation circumferentially about the distal collar segment 24 such that the sealing boot 54 and the stud insertion passageway 53 within the distal collar segment 24 are in substantially coaxial relation. In the illustrated exemplary construction, the sealing boot 54 includes a substantially annular outer face 56 defining a stud acceptance opening 58 aligned with the stud insertion passageway 53 and adapted to receive the proximal end of the ball stud 40. In this regard, the stud acceptance opening 58 may expand resiliently during insertion of the ball structure 42 and then rebound to sealingly surround a reduced diameter neck 46 inboard from the ball structure 42. As shown, a raised hollow nipple 60 of flexible character may surround the stud acceptance opening 58 to aid in forming a seal about the neck 46 following insertion of the ball stud 40. As will be appreciated, the sealing boot 54 may act to contain any lubricant within the socket cavity 50 while also blocking debris from entering the joint.

Referring now jointly to FIGS. 6-8, in one exemplary construction, the socket cavity 50 may optionally include a pair of molded-in flexible flaps 62 of substantially wedge-shaped cross-section arranged in a generally "V" orientation relative to one another at the base of the socket cavity 50 such that free edges of the flaps 62 diverge from one another. The flaps 62 are oriented with their length dimension substantially parallel to the stud insertion passageway 53 defining the insertion path of the ball structure 42. In practice, the flaps 62 are adapted to flex resiliently from their normal unstressed position (FIG. 7) towards the adjacent inner wall 63 of the socket cavity 50 (FIG. 8) when the ball structure 42 is within the socket cavity 50. In this flexed condition, the flaps 62 will define leaf spring elements which bias continuously against the surface of the ball structure 42 during rotation of the ball structure 42 within the socket cavity. As will be understood, such a continuous biasing relation may permit the flaps to maintain contact with the ball structure 42 as surfaces wear over time. Of course, it is also contemplated that the flaps 62 may be eliminated if desired.

As best seen in FIG. 6, the socket cavity 50 may also include an arrangement of flexible raised interior ribs 66 which are molded into the socket cavity and are adapted to press against the ball structure 42 during use. As shown, the interior ribs 66 may follow the contour of the bowl-shaped socket cavity 50 so as to extend both radially and axially within the interior of the socket cavity. As illustrated, in the exemplary orientation, one of the ribs 66 may extend between the flaps 62 at the base of the socket cavity if desired. In the illustrated exemplary construction, a substantially flat, flexible raised hub 67 may be molded into the back of the socket cavity 50 in substantial alignment with the stud insertion passageway 53 such that the interior ribs 66 and the raised hub 67 form a hub and spoke orientation. Pockets 68 defining depressions between the interior ribs 66 may act to retain lubricant and to prevent debris from contacting the ball surface. Since the socket head 14 may be molded as a unitary structure, all interior components may be formed from a common resilient polymeric material.

As will be appreciated, the flexible socket cradle 22 and flexible interior ribs 66 may facilitate ease of ball insertion during assembly. Moreover, the flexible interior ribs 66 of resilient character may provide a level of precompression to establish torque at levels to achieve desired performance and durability.

As will be understood, a linking arm assembly in accordance with the present disclosure may be readily adapted to a wide variety of environments by changing the length and/or geometry of the rod. By way of example only, and not limitation, FIG. 9 illustrates an alternative embodiment consistent with the present disclosure wherein elements described previously are designated by corresponding reference numerals increased by 100. As shown, in this embodiment, the rod 112 is substantially round in cross section and the surface ribs 116 extend in annular relation around the full perimeter of the rod 112. The access openings 126 in the socket heads 114 are likewise circular to receive the rod 112 in sealed relation. In all other respects, the embodiment of FIG. 9 acts in accordance with the description as provided previously.

In some environments of use it may be desirable to provide a substantially high ball stud pull out force. For such applications the socket cavity may be constructed to enhance the surface area contacting the ball structure while nonetheless permitting relative rotation as may be desired. Referring now to FIG. 10, one embodiment consistent with the present disclosure and providing enhanced pull out force is illustrated, wherein elements described previously are designated by corresponding reference numerals within a 200 series.

In the illustrated exemplary socket head 214 of FIG. 10 which is adapted to provide high ball stud pull out force, both the flaps and the interior ribs have been eliminated such that the socket cavity 250 defines a substantially smooth, concave surface adapted to receive a cooperating ball structure (not shown). In this construction, a pattern of relatively narrow grease grooves 266 may be arranged in a hub and spoke configuration relative to a shallow grease well 267 at the rear of the cavity. In this regard, the grease grooves 266 may be arranged in substantially the same pattern as the raised ribs described in relation to the earlier described embodiments.

In the exemplary construction illustrated in FIG. 10, the socket cavity 250 may have a diameter which substantially matches, or is slightly less than the cooperating ball structure (not shown) so as to promote a close fit relationship. The socket cavity depth extends about an arc which is greater than 180 degrees such that the socket cradle 222 extends in wrap-around relation past the midpoint of the ball structure upon insertion of the ball structure. As will be appreciated, in this construction the high surface area interface between the interior of the socket cavity 250 and the surface of the ball structure will substantially increase the force required to pull the ball structure out of the flexible socket cradle 222. The substantially wedge-shaped surface elements 268 disposed between the grease grooves 266 may act as slightly compressible spring elements which continuously bias against the surface of the cooperating ball structure so as to promote centering while maintaining contact and preventing looseness during use. At the same time, lubricant may be transmitted between the socket cavity 250 and the ball structure through the grease grooves 266 thereby facilitating relative rotation during use.

While various spatial and directional terms, such as upper, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Of course, variations and modifications of the foregoing are within the scope of the present disclosure. It is to be understood that the disclosure herein extends to all alternative combinations of two or more of the individual features mentioned or evident from the text and/or drawings. All of these different combinations constitute various alternative aspects of the present disclosure. The embodiments described herein will enable others skilled in the art to utilize the contents of the disclosure. The claims are to be construed to include alternative embodiments to the fullest extent permitted by the prior art.

What is claimed is:

1. A linking arm assembly adapted to receive and retain a ball stud, the assembly comprising:
    an elongated rod comprising a terminal end with at least one radially projecting surface rib disposed adjacent the terminal end and wherein the surface rib defines a raised surface, the terminal end projecting outboard from the surface rib;
    at least a first socket head of unitary molded construction adapted for press-fit attachment to the terminal end of the rod, wherein the socket head includes a socket cradle, a resilient proximal body segment extending away from the socket cradle in a first direction, and a distal collar segment extending away from the socket cradle in a second direction, the proximal body segment including an interior channel adapted to receive the terminal end of the rod with an access opening facing away from the socket cradle, the distal collar segment defining a stud insertion passageway substantially aligned with a concave socket cavity within the socket cradle adapted to receive and retain a ball structure of the ball stud; and
    a flexible sealing boot having a first end adapted for disposition in sealing relation about the distal collar segment and a second end adapted to sealingly surround a portion of the ball stud outboard from the ball structure.

2. The linking arm assembly as recited in claim 1, wherein the surface rib has a substantially rounded nose profile with upper and lower curved surfaces extending to outer edges of the surface rib.

3. The linking arm assembly as recited in claim 2, wherein the socket head is substantially "L" shaped.

4. The linking arm assembly as recited in claim 2, wherein the interior channel is molded in substantial relief to the terminal end of the rod.

5. The linking arm assembly as recited in claim 4, wherein sidewalls of the interior channel include a molded-in substantially sine-wave interior profile adapted to fit in mated relation with the terminal end of the rod.

6. The linking arm assembly as recited in claim 5, wherein the access opening to the interior channel has a perimeter geometry substantially matching the cross section of the rod.

7. The linking arm assembly as recited in claim 1, wherein the socket cavity is substantially bowl-shaped.

8. The linking arm assembly as recited in claim 7, wherein depressed grease grooves extend along walls of the socket cavity in a hub and spoke pattern.

9. The linking arm assembly as recited in claim 7, wherein raised interior ribs extend along walls of the socket cavity in a hub and spoke pattern.

10. The linking arm assembly as recited in claim 9, wherein one of the raised interior ribs is disposed between a pair of flaps arranged in a "V" pattern, the flaps defining leaf spring elements adapted to engage and apply continuous biasing force against the ball structure within the socket cavity during rotation.

11. A linking arm assembly adapted to receive and retain a ball stud, the assembly comprising:

an elongated rod of polymeric cross section comprising a first terminal end and a second terminal end, a first plurality of radially projecting, spaced-apart surface ribs disposed adjacent the first terminal end and a second plurality of radially projecting, spaced-apart surface ribs disposed adjacent the second terminal end, wherein the surface ribs define raised surfaces with an intermediate depression between the surface ribs, the first terminal end and the second terminal end each projecting outboard from adjacent surface ribs, the surface ribs defining an effective diameter which is greater than the effective diameter of the adjacent terminal ends and greater than the effective diameter of the portion of the rod inboard from the surface ribs;

a first socket head of unitary molded construction adapted for press-fit attachment to the first terminal end and a second socket head of unitary molded construction adapted for press-fit attachment to the second terminal end, wherein each of the socket heads includes a socket cradle, a resilient proximal body segment extending away from the socket cradle in a first direction, and a distal collar segment extending away from the socket cradle in a second direction, the proximal body segment of each socket head including an interior channel with an access opening facing away from the associated socket cradle, the interior channels each adapted to receive a terminal end of the rod, the distal collar segment of each socket head defining a stud insertion passageway substantially aligned with a concave socket cavity within the socket cradle adapted to receive and retain a ball structure of a ball stud; and a flexible sealing boot having a first end adapted for disposition in sealing relation about the distal collar segment and a second end adapted to sealingly surround a portion of the ball stud outboard from the ball structure.

12. The linking arm assembly as recited in claim 11, wherein each of the surface ribs has a substantially rounded nose profile with upper and lower curved surfaces extending to outer edges of the ribs.

13. The linking arm assembly as recited in claim 12, wherein each of the socket heads is substantially "L" shaped.

14. The linking arm assembly as recited in claim 12, wherein each of the interior channels is molded in substantial relief to a terminal end of the rod.

15. The linking arm assembly as recited in claim 14, wherein the sidewalls of the interior channels include a molded-in substantially sine-wave interior profile adapted to fit in mated relation with the surface ribs at a terminal end of the rod.

16. The linking arm assembly as recited in claim 15, wherein the access opening to each of the interior channels has a perimeter geometry substantially matching the cross section of the rod.

17. The linking arm assembly as recited in claim 11, wherein each of the socket cavities is substantially bowl-shaped.

18. The linking arm assembly as recited in claim 17, wherein raised interior ribs extend along walls of each of the socket cavities in a hub and spoke pattern.

19. The linking arm assembly as recited in claim 17, wherein depressed grease grooves extend along walls of the socket cavity in a hub and spoke pattern.

20. A linking arm assembly adapted to receive and retain a ball stud, the assembly comprising:

an elongated rod of polymeric cross section comprising a first terminal end and a second terminal end, a first plurality of radially projecting, spaced-apart surface ribs disposed adjacent the first terminal end and a second plurality of radially projecting, spaced-apart surface ribs disposed adjacent the second terminal end, wherein the surface ribs define raised surfaces with an intermediate depression between the surface ribs, the first terminal end and the second terminal end each projecting outboard from the surface ribs, the surface ribs defining an effective diameter which is greater than the effective diameter of the adjacent terminal ends and greater than the effective diameter of the portion of the rod inboard from the surface ribs, wherein each of the surface ribs has a substantially rounded nose profile with upper and lower curved surfaces extending to outer edges of the ribs;

a first socket head of unitary molded construction adapted for press-fit attachment to the first terminal end and a second socket head of unitary molded construction adapted for press-fit attachment to the second terminal end, wherein each of the socket heads is substantially "L" shaped including a socket cradle, a resilient proximal body segment extending away from the socket cradle in a first direction, and a distal collar segment extending away from the socket cradle in a second direction, the proximal body segment including an interior channel with an access opening to the interior channel facing away from the socket cradle, the interior channel adapted to receive a terminal end of the rod and molded in substantial relief to the terminal end of the rod with sidewalls having a substantially sine-wave interior profile adapted to fit in mated relation with the surface ribs at the terminal end of the rod, and wherein the access opening has a perimeter geometry substantially matching the cross section of the rod, the distal collar segment defining a stud insertion passageway substantially aligned with a substantially bowl-shaped socket cavity within the socket cradle adapted to receive and retain a ball structure of the ball stud, wherein the socket cavity includes a plurality of molded in grease grooves extending radially and axially along walls of the socket cradle in a hub and spoke pattern; and a flexible sealing boot having a first end adapted for disposition in sealing relation about the distal collar segment and a second end comprising an outer face with a stud acceptance opening adapted to sealingly surround a portion of the ball stud outboard from the ball structure.

* * * * *